(12) United States Patent
Guy (10) Patent No.: US 10,743,714 B2
(45) Date of Patent: Aug. 18, 2020

(54) KITCHEN COOKING APPLIANCE WITH MOBILE DRAIN FLUID RECEPTACLE

(71) Applicant: ILLINOIS TOOL WORKS INC., Glenview, IL (US)

(72) Inventor: Eric D. Guy, Ellicott City, MD (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 514 days.

(21) Appl. No.: 15/424,129

(22) Filed: Feb. 3, 2017

(65) Prior Publication Data
US 2018/0220847 A1 Aug. 9, 2018

(51) Int. Cl.
A47J 37/12 (2006.01)
A47J 27/14 (2006.01)

(52) U.S. Cl.
CPC .......... *A47J 37/1285* (2013.01); *A47J 27/14* (2013.01); *A47J 37/1271* (2013.01)

(58) Field of Classification Search
CPC .............................. A47J 37/1285; A47J 27/14
See application file for complete search history.

(56) References Cited

U.S. PATENT DOCUMENTS

| | | | |
|---|---|---|---|
| 3,714,885 A * | 2/1973 | Wertheimer | A47J 37/0676 99/425 |
| 4,517,886 A * | 5/1985 | Bales | F24C 15/14 126/41 R |
| 4,635,950 A * | 1/1987 | Le Sage | B62B 1/10 220/592.2 |
| 4,778,191 A | 10/1988 | Heisson | |
| 4,877,261 A | 10/1989 | Heisson | |
| 5,139,278 A | 8/1992 | Vlasicak | |
| 5,370,409 A | 12/1994 | Latouche | |
| 5,667,113 A | 9/1997 | Clarke et al. | |

(Continued)

FOREIGN PATENT DOCUMENTS

JP 2004024767 1/2004
WO WO 2007126268 11/2007
(Continued)

OTHER PUBLICATIONS

Henny Penny: "Fryer Oil Disposal System" https://www.hennypenny.com/wp-content/uploads/2013/12/ODS-300-data-sheet-05.06.13.pdf, i page (Year: 2013).*

(Continued)

*Primary Examiner* — Ibrahime A Abraham
*Assistant Examiner* — Elizabeth M Sims
(74) *Attorney, Agent, or Firm* — Thompson Hine LLP (57) ABSTRACT

A cooking appliance includes a housing and at least one upwardly facing cooking wall on which food product can directly sit for cooking, where the cooking wall is supported by the housing and has an associated drain path for residual cooking fluid and/or for cleaning fluid, where the drain path includes an outlet end. A mobile fluid receptacle located in an installed use position within the housing is positioned below the cooking wall. The mobile fluid receptacle is movable to a transport position fully disengaged from the housing. The mobile fluid receptacle may be configured to sit in a generally horizontal use orientation when in the installed use position, as well as an upright orientation when disengaged from the housing.

14 Claims, 8 Drawing Sheets

(56) References Cited

U.S. PATENT DOCUMENTS

| | | | |
|---|---|---|---|
| 5,678,531 A * | 10/1997 | Byers | A47J 37/0704 |
| | | | 126/25 R |
| 6,390,495 B1 | 5/2002 | Cates | |
| 6,634,659 B2 | 10/2003 | Sanskrit | |
| 6,722,672 B2 | 4/2004 | Cates et al. | |
| 2013/0098251 A1 * | 4/2013 | Lambert | A47J 37/1223 |
| | | | 99/408 |

FOREIGN PATENT DOCUMENTS

| | | |
|---|---|---|
| WO | WO 2015/053867 | 4/2015 |
| WO | WO 2015/157152 | 10/2015 |
| WO | WO 2015/157400 | 10/2015 |
| WO | WO-2015157400 A1 * | 10/2015 |

OTHER PUBLICATIONS

YouTube video: Rubbermaid Grease Caddy, https://www.youtube.com/watch?v=L7HeIXUVXu0, published on Aug. 22, 2008. (Year: 2008).*

Henny Penny: "Fryer Oil Disposal System" https://www.hennypenny.com/wp-content/uploads/2013/12/ODS-300-data-sheet-05.06.13.pdf, 1 page (Year: 2013).*

Henny Penny: "Fryer Oil disposal System" http://www.hennypenny.com/wp-content/uploads/2013/12/ODS-300-data-sheet-05.06.13.pdf, 1 page.

PCT, International Search Report and Written Opinion, International Application No. PCT/US2018/015976; dated Apr. 16, 2018, 18 pages.

* cited by examiner

KITCHEN COOKING APPLIANCE WITH MOBILE DRAIN FLUID RECEPTACLE

TECHNICAL FIELD

This application relates generally to commercial kitchen cooking appliances and, more specifically, to mobile drain fluid receptacle for a kitchen cooking appliance such as a braising pan or griddle.

BACKGROUND

Numerous professional cooking appliances have a cooking vessel, this vessel being able to have a drain hole or evacuation hole for cooking products and/or cooking water or washing water. It is known to equip the drain hole of this type of appliance with a drain plug.

For example, PCT Application No. PCT/US2015/024896 (published as WO 2015/157400 and incorporated herein by reference) discloses a braising pan with a cooking vessel, the drain hole of which is equipped with a filtering drain plug, which is preferably removable, for a drain hole of the cooking vessel, having a stopper designed to shut off the drain hole, and a filter basket which is designed to be received in the drain hole and which is mounted so as to be able to move with respect to the stopper. As described in PCT Application No. PCT/US2015/024467 (published as WO 2015/157152 and incorporated herein by reference), material drained from the drain hole can be delivered to a recovery tank formed within a sliding drawer assembly of the housing of the braising pan, which sliding drawer assembly is raised along the height of housing. Alternatively, material drained from the drain hole can be delivered along a drain path leading to a floor drain below the appliance.

In many cases applicable rules, regulations or codes do not permit draining of various types of material directly to a floor drain. This limit presents a difficulty for users in terms of how to deal with some materials that are drained.

It would be desirable to provide braising pan appliance, or similar kitchen appliance, with a fluid receptacle that is more user friendly.

SUMMARY

In one aspect, a cooking appliance includes a housing and at least one upwardly facing cooking wall on which food product can directly sit for cooking, where the cooking wall is supported by the housing and has an associated drain path for residual cooking fluid and/or for cleaning fluid, where the drain path includes an outlet end. A mobile fluid receptacle located in an installed use position within the housing is positioned below the cooking wall. The mobile fluid receptacle has a first end, a second end and an upwardly facing inlet opening positioned toward the first end to receive residual cooking fluid and/or cleaning fluid from the outlet end of the drain path. The mobile fluid receptacle includes a wheel arrangement at the second end and a handle at the first end, and the mobile fluid receptacle is movable to a transport position fully disengaged from the housing.

In another aspect, a cooking appliance includes a housing and at least one cooking wall for heating food product, where the cooking wall is supported by the housing. A drain path is provided for delivering residual cooking fluid and/or for cleaning fluid away from the cooking wall. A mobile fluid receptacle is located in an installed use position within the housing, the mobile fluid receptacle an inlet opening positioned to receive residual cooking fluid and/or cleaning fluid from the drain path, the mobile fluid receptacle is movable to a transport position fully disengaged from the housing. The mobile fluid receptacle is configured such that at least one of: (i) when in the installed use position the mobile fluid receptacle includes an inlet section proximate the inlet opening and a primary storage section adjacent and in fluid communication with the inlet section, wherein the primary storage section is enclosed on all sides except where the primary storage section abuts the inlet section, wherein the primary storage section has a depth that is greater than a depth of the inlet section; and/or (ii) when in the transport position the mobile fluid receptacle can be moved into an upright orientation the causes fluid therein to shift away from the inlet opening.

In a further aspect, a mobile cooking fluid receptacle installable within a housing of kitchen cooking appliance in a use orientation for receiving residual cooking fluid and/or cleaning fluid from a drain path is provided. In the use orientation the mobile fluid receptacle has a first end, a second end and an upwardly facing inlet opening positioned toward the first end to receive residual cooking fluid and/or cleaning fluid. The mobile fluid receptacle includes a wheel arrangement at the second end and a handle at the first end. The mobile fluid receptacle is configured such that at least one of: (i) in the use orientation the mobile fluid receptacle includes an inlet section below the inlet opening and a primary storage section adjacent and in fluid communication with the inlet section, wherein the primary storage section is enclosed on all sides except where the primary storage section abuts the inlet section, wherein the primary storage section has a depth that is greater than a depth of the inlet section; and/or (ii) the mobile fluid receptacle can be reoriented from the use orientation into an upright orientation the causes fluid therein to shift away from the inlet opening.

The details of one or more embodiments are set forth in the accompanying drawings and the description below. Other features, objects, and advantages will be apparent from the description and drawings, and from the claims.

DETAILED DESCRIPTION

Referring to FIGS. 1-13, a commercial cooking appliance 10, in the form of a braising pan unit is shown, and includes a housing 12 that supports a vessel 14 for cooking. The housing 12 (e.g., typically of metal frame and panel construction) includes a front side 16 with one or more controls 18 (e.g., knobs) and a back side 20 (e.g., typically positioned alongside a wall when in use). The vessel 14 includes a bottom cooking wall 30 and front 32, back 34, left 36 and right 38 side walls extending upwardly from the bottom wall. In one implementation, and unlike typical fryer vessels that tend to be fairly deep, in the braising pan vessel 14 the front, rear, left and right sidewalls extend upward to a distance (e.g., $D_W$ in FIG. 5) no more than eight inches (e.g., no more than six inches) above a top surface of the bottom wall 30.

In the illustrated embodiment, an electrical heater arrangement 40 is positioned adjacent the underside of the bottom wall 30. For example, a thick layer heating element as described in PCT Application No. PCT/US2015/053867 could be attached to the bottom side of the bottom cooking wall 30. However, other electrical heater arrangements could be used, and in other embodiments heating of the bottom cooking wall 30 could be achieved utilizing a gaseous fuel heating element and/or gaseous fuel combustion gases.

The braising pan vessel 14 has numerous uses in a typical kitchen, including uses in which food items are placed directly on the top surface of the bottom cooking wall 30 for cooking. The vessel 14 may also be used for cooking food product by boiling and thus a water feed pipe 42 includes an outlet 44 positioned for feeding water into a top opening of the vessel 14. The water feed also provides the ability to deliver water into the vessel 14 for the purpose of cleaning the vessel. Regardless of how the vessel 14 is used, fluids within the vessel, such as residual cooking fluids (e.g., water, grease, and/or other food liquids, with or without food debris) and/or or cleaning fluids (e.g., water, with or without cleaning chemicals) must be drained from the vessel.

In this regard, the vessel 14 has an associated drain path formed by an by an opening 50 in the bottom cooking wall 30, which leads to an initial cylindrical drain tube 52, which in feeds into a longer cylindrical drain tube 54 with a lower end 56 that defines the outlet end of the drain path. A movable stopper 58 is associated with the opening 50 for selective closing and opening of the opening 50 depending upon whether a user desires to allow fluids to drain along the drain path. The stopper 50 may be connected to a filter basket 60 that sits within the drain tube 52. The filter basket may be of the type described in PCT Application No. PCT/US2015/024896, but other variations are possible, and implementations without a filter basket are also possible.

A mobile fluid receptacle 70 (e.g., of stainless steel sheet construction) is located in an installed use position (e.g., FIGS. 1, 4, and 6-8) within the housing 12 and below the cooking wall. The mobile fluid receptacle 70 has a front end 72, a rear end 74 and an upwardly facing inlet opening 76 that is positioned toward the front end 72 to receive residual cooking fluid and/or cleaning fluid from the outlet end 56 of the drain path. Here, the inlet opening 76 is directly beneath the bottom of the drain tube 54. The mobile fluid receptacle includes a wheel arrangement 78 at the rear end and a handle 80 at the front end. As seen in FIG. 9, the mobile fluid receptacle 70 is movable (e.g., by pulling the handle 80 forward and rolling the receptacle forward per arrow 82 in FIG. 8) to a removed or transport position fully disengaged from the housing. The receptacle 70 can then be transported to a desired location for evacuation of any fluids therein and/or for cleaning.

Figure 1:
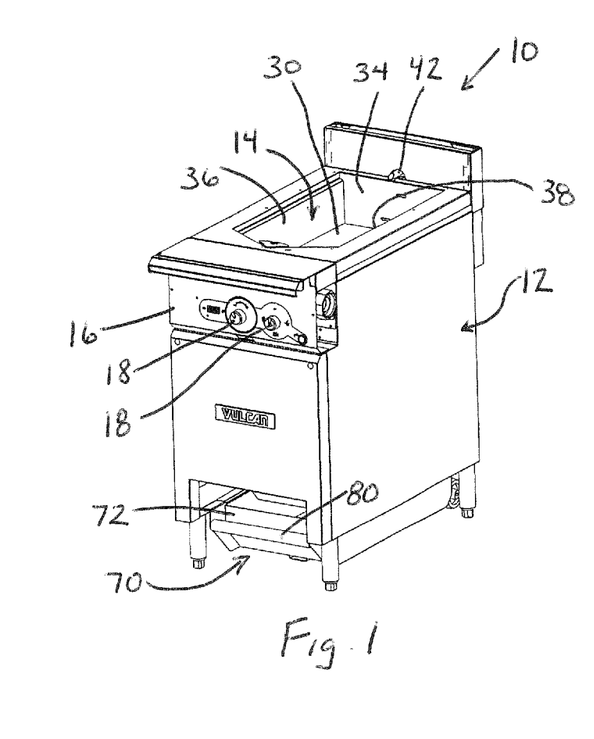
FIG. 1 shows a front perspective view of a braising pan cooking appliance.
Figure 2:
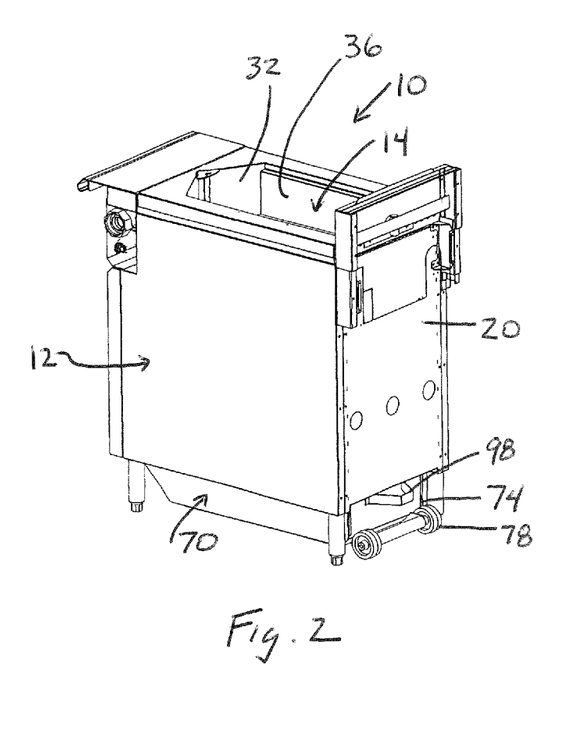
FIG. 2 shows a rear perspective view of the cooking appliance.
Figure 3:
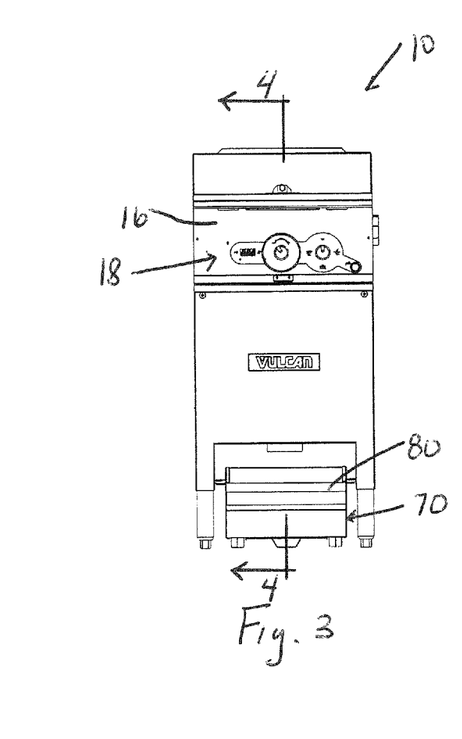
FIG. 3 shows a front elevation view of the cooking appliance.
Figure 4:
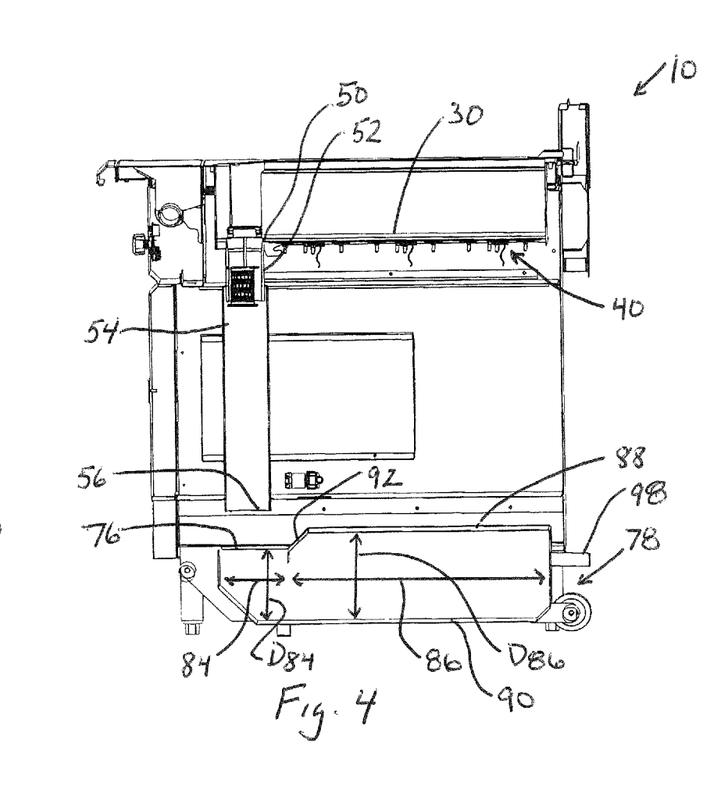
FIG. 4 shows a cross-section view taken along line 4-4 of FIG. 3.
Figure 5:
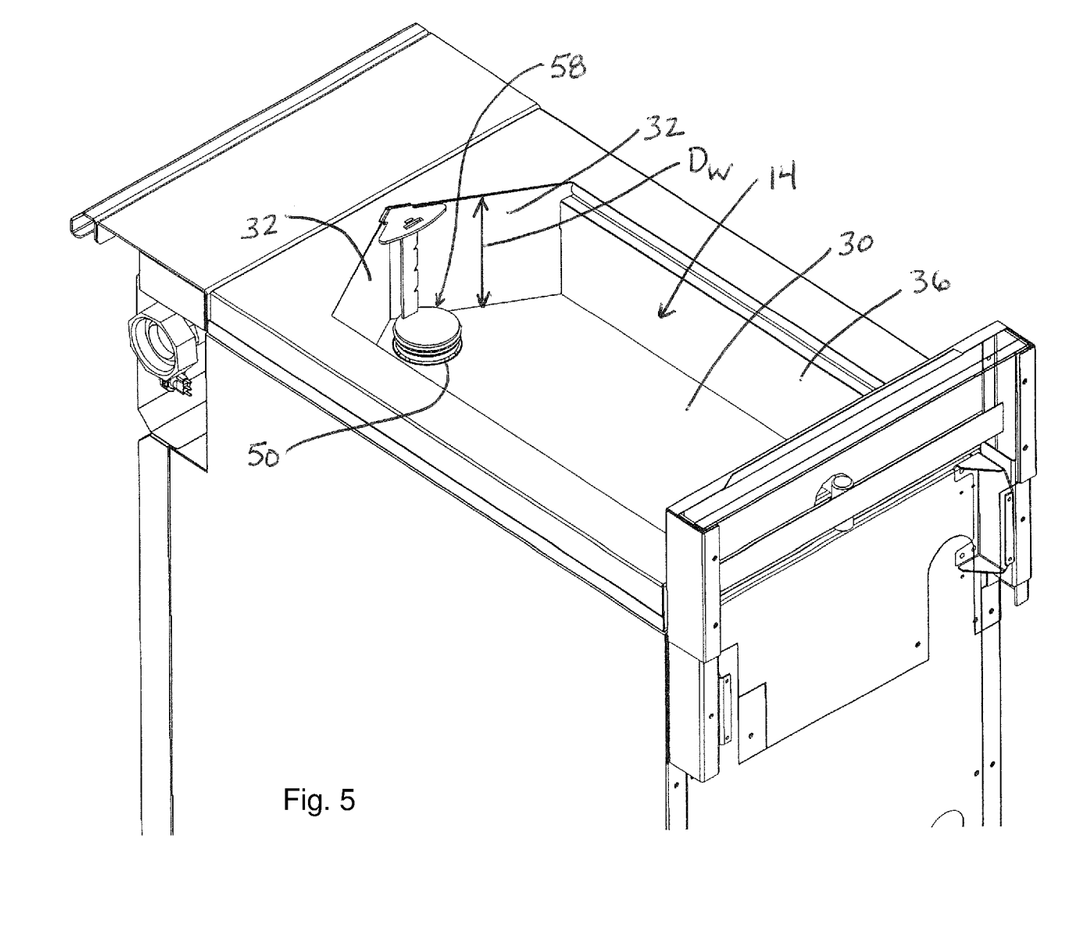
FIG. 5 shows a partial rear perspective view of the upper portion of the cooking appliance.
Figure 6:
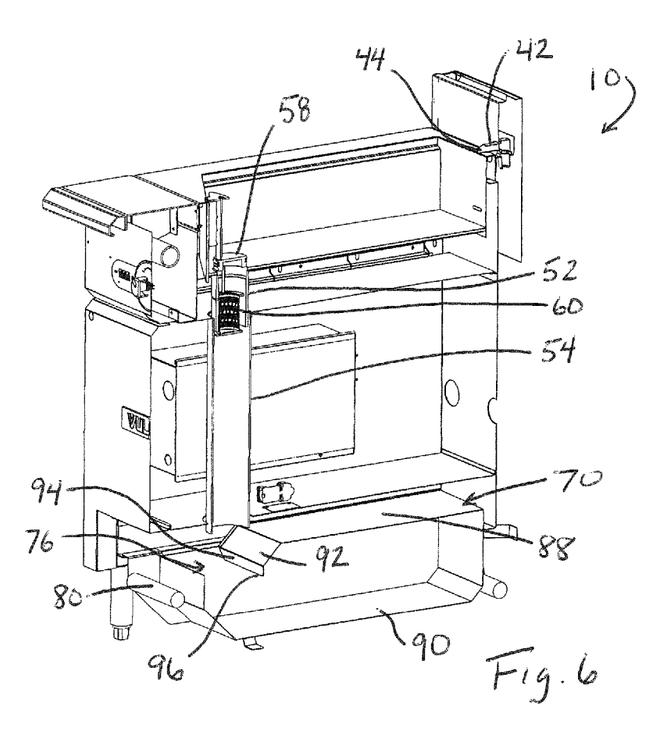
FIG. 6 shows a perspective view of the cooking appliance in cross-section taken along line 4-4 of FIG. 3.

As best seen in FIG. 4, in the installed use position the receptacle 70 includes an inlet section 84 below the inlet opening 82 and a primary storage section 86 adjacent and in fluid communication with the inlet section 84. Here, the primary storage section 86 is enclosed on all sides except where the primary storage section abuts the inlet section (here, closed at the top, bottom, rear, left and right sides, but not at the front side). Notably, the primary storage section 86 has a depth $D_{86}$ that is greater than a depth $D_{84}$ of the inlet section 84. Moreover, in the installed use position, the inlet opening 76 is located at a height that is lower than a height of a top wall 88 that extends over the primary storage section 86. The primary storage section 86 also has a storage volume that is greater than the storage volume of the inlet section 84 (e.g., at least twice the volume of the inlet section, such as at least three times as great as the volume of the inlet section).

A bottom wall 90 is common between the inlet section and the primary storage section, that is, the bottom wall 90 of the storage section continues forward and also delimits the bottom of the inlet section. However, in the illustrated embodiment, the top wall 88 does not extend over the inlet section 84. A baffle wall 92 extends downward from the front end of the top wall 88 toward the bottom wall, with a lower segment 94 of the baffle wall 92 at a location where the primary storage section 86 abuts the inlet section 84. The bottom edge 96 of the baffle wall is positioned lower than the inlet opening 76 but higher than the bottom wall 90.

Figure 7:
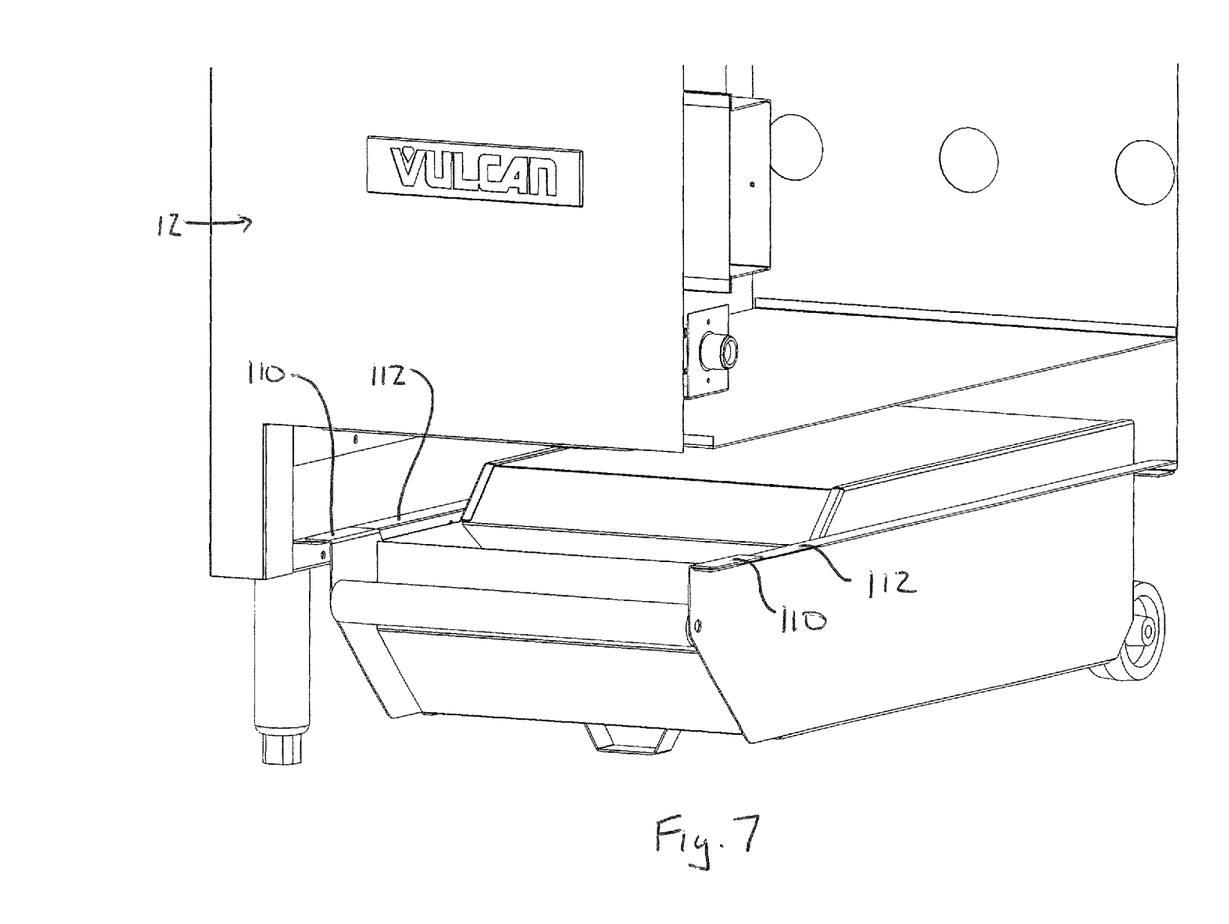
FIG. 7 shows a partial perspective cross-section of a lower portion of the cooking appliance.
Figures 8, 9:
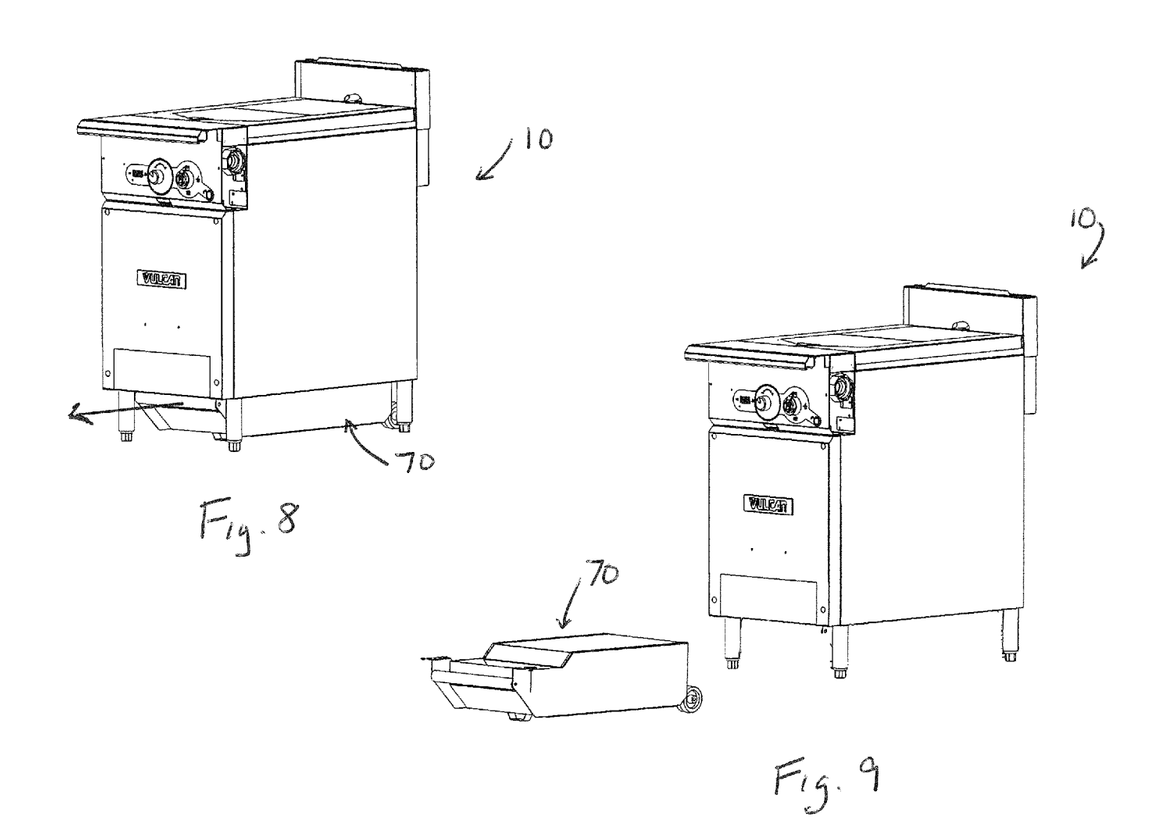
FIG. 8 is a perspective view of the cooking appliance with mobile fluid receptacle in an installed use position.
FIG. 9 is a perspective view of the cooking appliance with mobile fluid receptacle in a remove position for transport.
Figures 10, 11:
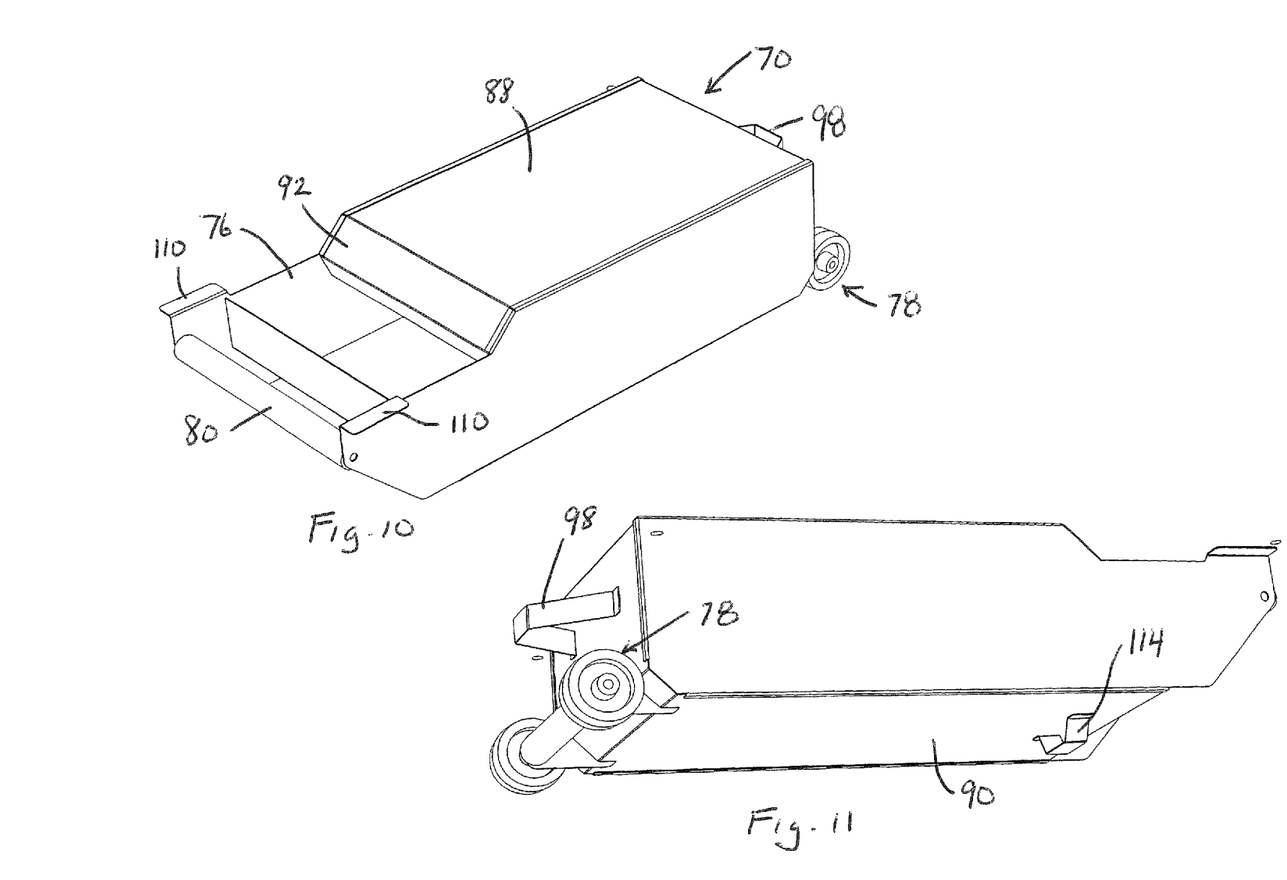
FIGS. 10 and 11 show perspective views of the mobile fluid receptacle.

Per FIGS. 7 and 10, the receptacle 70 may include outwardly extending side flanges 110 that sit on rails 112 within the housing 12 to support and/or align the receptacle when in the use position within the housing. In the illustrated embodiment, when in the installed use position the front of the receptacle 70 is supported in position by the flanges 110 sitting on the rails 112, while the back of the receptacle is supported by the wheel arrangement. However, other variations are possible.

Figures 12, 13:
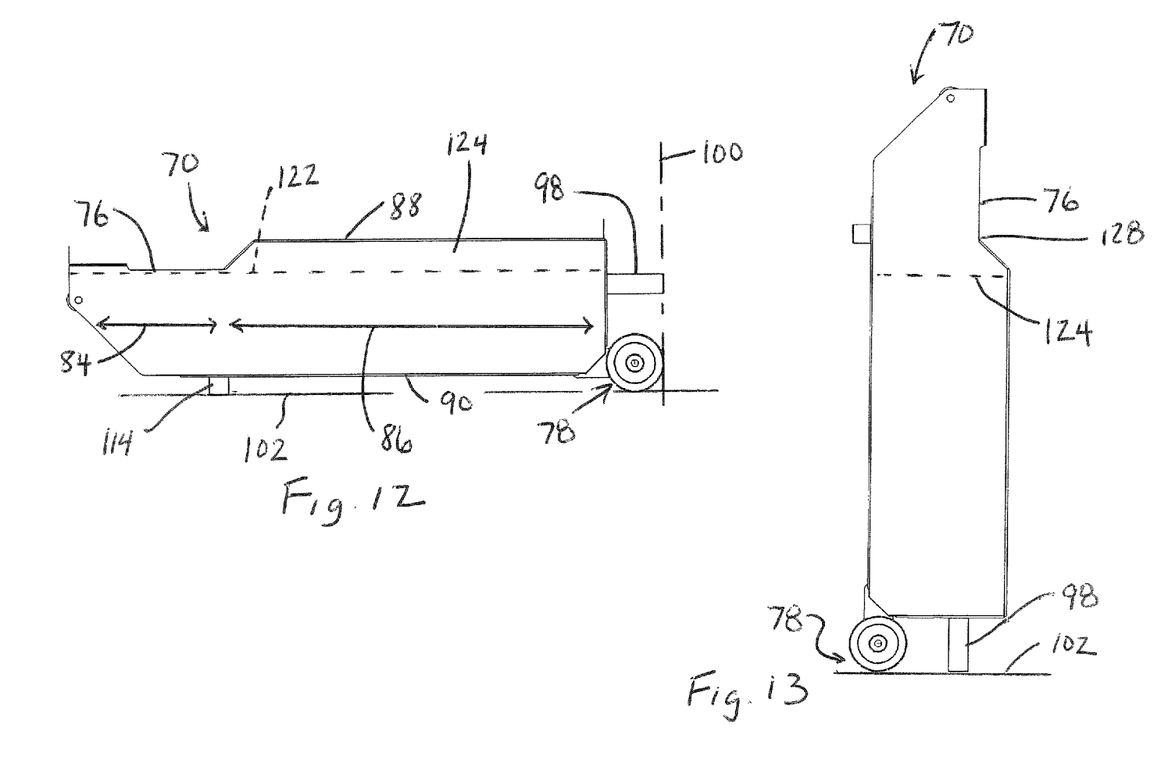
FIGS. 12 and 13 show side elevations of the mobile fluid receptacle.

A stand 98 is located at the rear end of the receptacle 70 and is spaced upwardly from the wheel arrangement 78. As best seen in FIG. 12, a rearwardly distal extent of the stand 98 and a rearwardly distal extent of a rolling surface path of the wheel arrangement 78 lie in a common substantially vertical plane 100. This configuration enables the receptacle to be shift to an upright orientation when the receptacle is in a transport position disengaged from the housing of the appliance. In particular, in the upright orientation shown in FIG. 13, the top wall 88 of the receptacle 70 faces laterally rather than upward, and the mobile fluid receptacle is supported in the upright orientation on the ground 102 via engagement of both the rearwardly distal extent of the rolling surface of the wheel arrangement 78 and the rearwardly distal extent of the stand 98. Thus, the receptacle is self-supporting in the upright orientation (i.e., requires no external support by a user). In the illustrated embodiment, the stand 98 is formed by a fixed metal bracket mounted (e.g., welded) at a rear wall of the primary storage section of the receptacle, but other stand configurations are possible. The bottom of the receptacle 70 includes a stand 114 that provides support for the front of the receptacle 70 when it is removed from the housing (e.g., per FIG. 12).

The overall configuration of the mobile receptacle 70 is particularly suited to transport and/or placement in the upright orientation when desired. In particular, per FIG. 12 the receptacle may be considered full when the liquid level therein reaches or closely approaches the height of the inlet opening 76, as suggested by exemplary liquid level 122. In this condition the primary storage section 86 still includes a material volumetric space 124, above liquid level 122, that is not filled by the captured liquid. The user then moves the receptacle out of the housing 12 (per FIGS. 8 and 9). The user can leave the receptacle in a use orientation (with inlet opening 76 and top wall 88 facing upward per FIG. 12), in which case the front stand 114 supports the front of the receptacle on the ground 102. In addition, the user can rotate the receptacle 70 toward the upright position of FIG. 13. As the receptacle is rotated upward, the liquid in the inlet section 84 moves into the primary storage section 86 under the force of gravity, and in turn the air in space 124 is displaced into the inlet section 84. Thus, in the upright orientation the final liquid level 126 is below the now "lower" edge 128 of the opening 76, which reduces the chance for spillage. Similar spillage reduction is achieved by transfer of the stored liquid into the primary storage section 86 even when the receptacle 70 is only moved to a partially upright orientation (e.g., 60 degrees upright) as may be typical when a user is pulling the receptacle from one location to another by the handle 80. A user may readily transport the receptacle 70 to a material collection location at which fluids can be pumped out of the receptacle and/or to a cleaning location for the receptacle. Removal and install of the receptacle to and from the housing of the cooking appliance is straightforward and convenient.

It is to be clearly understood that the above description is intended by way of illustration and example only, is not intended to be taken by way of limitation, and that other changes and modifications are possible. While a cooking appliance in the form of a braising pan unit is primarily described, the mobile fluid receptacle could be utilized in connection with other types of cooking appliances. By way of example, the cooking appliance could be in the form of a griddle, in which case the cooking wall would form the griddle cooking surface, and the drain path could be any drainage path that allows fluids to drain from the griddle surface, such as a tilt in the griddle cooking surface and/or one or more drainage channels in formed the griddle cooking surface. Use of the mobile fluid receptacle in connection with other cooking appliances is also contemplated.

Moreover, in certain embodiments the cooking appliance could incorporate one or more sensors to determine whether the receptacle is in its use position, in which case a user alert could be generated on the cooking appliance to remind the user that the receptacle is not present or is out of position, in an effort to avoid a situation of a user draining material from the vessel when the receptacle is not present or out of position. The cooking appliance controller could also prevent cooking operations in such cases (e.g., prevent operation of the heater). In another variation the receptacle could interact mechanically and/or electro-mechanically in some way with the outlet end (or other portion) of the drainage path such that when the receptacle is not present or is out of position, the outlet end (or other portion) is closed to prevent fluid travel beyond the outlet end. Other variations and modifications are possible.

What is claimed is:

1. A cooking appliance, comprising:
   a housing;
   at least one upwardly facing cooking wall on which food product can directly sit for cooking, the cooking wall supported by the housing and having an associated drain path for residual cooking fluid and/or for cleaning fluid, wherein the drain path includes an outlet end;
   a mobile fluid receptacle located in an installed use position within the housing and below the cooking wall, the mobile fluid receptacle having a first end, a second end and an upwardly facing inlet opening positioned toward the first end to receive residual cooking fluid and/or cleaning fluid from the outlet end of the drain path, the mobile fluid receptacle including a wheel arrangement at the second end and a handle at the first end, wherein the mobile fluid receptacle disengageable from the housing for transport;
   wherein, when in the installed use position, the mobile fluid receptacle includes an inlet section below the inlet opening and a primary storage section adjacent and in fluid communication with the inlet section, wherein the primary storage section is enclosed on all sides except where the primary storage section abuts the inlet section;
   wherein, when in the installed use position, the mobile fluid receptacle includes a bottom wall that is common between the inlet section and the primary storage section, and the primary storage section includes a top wall that does not extend over the inlet section and that is higher than the inlet opening such that, when a liquid level in the mobile fluid receptacle reaches a height of the inlet opening, the primary storage section includes an air space above the liquid level that is not filled by liquid such that, when the mobile fluid receptacle is shifted to an upright position with the inlet opening higher than the primary storage section, liquid in the inlet section moves into the primary storage section under the force of gravity and, in turn, air in the air space is displaced into the inlet section;
   wherein the primary storage section has a depth that is greater than a depth of the inlet section and the primary storage section is within the housing when the mobile fluid receptacle is in the installed use position.

2. The cooking appliance of claim 1 wherein the cooking wall is formed as the bottom of a vessel that includes upwardly extending front, rear, left and right sidewalls, and the drain path is formed in part by a drain hole in the bottom wall or one of the sidewalls.

3. The cooking appliance of claim 2 wherein at least one of the front, rear, left and right sidewalls of the vessel extends upwardly no more than eight inches above a top surface of the cooking wall.

4. The cooking appliance of claim 3, further comprising a water feed path with an outlet positioned for selectively feeding water into a top opening of the vessel for cleaning purposes.

5. The cooking appliance of claim 2, further comprising a movable stopper associated with the drain hole to enable selective draining of the vessel.

6. The cooking appliance of claim 1 wherein the cooking wall is formed as a griddle cooking surface, and the drain path is formed in part by a tilt in the griddle cooking surface and/or one or more drainage channels in formed the griddle cooking surface.

7. The cooking appliance of claim 1 wherein, when the mobile fluid receptacle is in the installed use position:
   a baffle wall extends downward from the top wall toward the bottom wall at a location where the primary storage section abuts the inlet section, and a bottom of the baffle wall is positioned lower than the inlet opening but higher than the bottom wall.

8. The cooking appliance of claim 7 wherein, when the mobile fluid receptacle is in the installed use position:
   the first end is a forward end and the second end is a rearward end, the mobile fluid receptacle includes a stand located at the rearward end and spaced upwardly from the wheel arrangement, and a rearwardly distal extent of the stand and a rearwardly distal extent of a rolling surface path of the wheel arrangement lie in a common substantially vertical plane.

9. The cooking appliance of claim 8 wherein, when the mobile fluid receptacle is shifted to the upright orientation, the mobile fluid receptacle is supported in the upright orientation on the ground via engagement of both the rearwardly distal extent of the rolling surface and the rearwardly distal extent of the stand.

10. A cooking appliance, comprising:

a housing;

at least one cooking wall for heating food product, the cooking wall supported by the housing;

a drain path for delivering residual cooking fluid and/or for cleaning fluid away from the cooking wall;

a mobile fluid receptacle located in an installed use position within the housing, the mobile fluid receptacle including an inlet opening positioned to receive residual cooking fluid and/or cleaning fluid from the drain path, the mobile fluid receptacle is disengageable from the housing, wherein the mobile fluid receptacle is configured such that:

when in the installed use position, the mobile fluid receptacle includes an inlet section below the inlet opening and a primary storage section adjacent and in fluid communication with the inlet section, wherein the primary storage section is enclosed on all sides except where the primary storage section abuts the inlet section;

when in the installed use position, the mobile fluid receptacle includes a bottom wall that is common between the inlet section and the primary storage section, and the primary storage section includes a top wall that does not extend over the inlet section and that is higher than the inlet opening such that, when a liquid level in the mobile fluid receptacle reaches a height of the inlet opening, the primary storage section includes an air space above the liquid level that is not filled by liquid such that, when the mobile fluid receptacle is shifted to an upright position with the inlet opening higher than the primary storage section, liquid in the inlet section moves into the primary storage section under the force of gravity and, in turn, air in the air space is displaced into the inlet section, wherein the primary storage section has a depth that is greater than a depth of the inlet section and the primary storage section is within the housing when the mobile fluid receptacle is in the installed use position.

11. A cooking appliance, comprising:

a housing supporting a cooking wall and a drain path for cooking fluid;

a mobile cooking fluid receptacle installable within the housing in a use orientation for receiving residual cooking fluid and/or cleaning fluid from the drain path, in the use orientation the mobile fluid receptacle having a first end, a second end and an upwardly facing inlet opening positioned toward the first end to receive residual cooking fluid and/or cleaning fluid, the mobile fluid receptacle including a wheel arrangement at the second end and a handle at the first end, wherein the mobile fluid receptacle is configured such that:

in the use orientation, the mobile fluid receptacle includes an inlet section below the inlet opening and a primary storage section adjacent and in fluid communication with the inlet section, wherein the primary storage section is enclosed on at sides except where the primary storage section abuts the inlet section;

in the use orientation, the mobile fluid receptacle includes a bottom wall that is common between the inlet section and the primary storage section, and the primary storage section includes a top wall that does not extend over the inlet section and that is higher than the inlet opening such that, when a liquid level in the mobile fluid receptacle reaches a height of the inlet opening, the primary storage section includes an air space above the liquid level that is not filled by liquid such that, when the mobile fluid receptacle is shifted to an upright orientation with the inlet opening higher than the primary storage section, liquid in the inlet section moves into the primary storage section under the force of gravity and, in turn, air in the air space is displaced into the inlet section, wherein the primary storage section has a depth that is greater than a depth of the inlet section and the primary storage section is within the housing when the mobile fluid receptacle is in the use orientation.

12. The cooking appliance of claim 11 wherein, in the use orientation, a baffle wall extends downward from the top wall toward the bottom wall at a location where the primary storage section abuts the inlet section, a bottom of the baffle wall is positioned lower than the inlet opening but higher the bottom wall.

13. The cooking appliance of claim 12 wherein, in the use orientation, the mobile fluid receptacle includes a stand located at the second end and spaced upwardly from the wheel arrangement, wherein a rearwardly distal extent of the stand and a rearwardly distal extent of a rolling surface path of the wheel arrangement lie in a common substantially vertical plane.

14. The cooking appliance of claim 13 wherein, when the mobile fluid receptacle is shifted to the upright orientation, the mobile fluid receptacle is supported in the upright orientation on the ground via engagement of both the rearwardly distal extent of the rolling surface and the rearwardly distal extent of the stand.

* * * * *